(12) United States Patent
Laxhuber et al.

(10) Patent No.: US 6,774,595 B1
(45) Date of Patent: Aug. 10, 2004

(54) DEVICE AND METHOD FOR MONITORING A BRAKE-APPLYING ELECTROMECHANICAL DEVICE FOR VEHICLE BRAKES

(75) Inventors: Thomas Laxhuber, Massing (DE); Hans Baumgartner, Moosburg (DE); Wolfgang Pahle, Heilbronn (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 43 days.

(21) Appl. No.: 10/031,451

(22) PCT Filed: Jul. 14, 2000

(86) PCT No.: PCT/EP00/06728
§ 371 (c)(1),
(2), (4) Date: Jul. 1, 2002

(87) PCT Pub. No.: WO01/05638
PCT Pub. Date: Jan. 25, 2001

(30) Foreign Application Priority Data

Jul. 20, 1999 (DE) ......................................... 199 33 962

(51) Int. Cl.⁷ .............................................. B60T 17/08
(52) U.S. Cl. ........................... 318/565; 318/372; 303/20
(58) Field of Search ................................ 318/565, 566, 318/650, 372; 303/15, 16, 20

(56) References Cited

U.S. PATENT DOCUMENTS

| | | |
|---|---|---|
| 4,721,344 A | 1/1988 | Frait et al. |
| 6,213,567 B1 * | 4/2001 | Zittlau et al. .................. 303/20 |
| 6,217,131 B1 * | 4/2001 | Schanzenbach ............. 303/112 |
| 6,241,326 B1 * | 6/2001 | Ferguson et al. ........... 303/177 |
| 6,270,172 B1 * | 8/2001 | Shirai et al. ................. 303/152 |
| 6,606,548 B2 * | 8/2003 | Kato et al. ..................... 701/71 |

FOREIGN PATENT DOCUMENTS

| | | |
|---|---|---|
| DE | 25 46 470 | 4/1976 |
| DE | 0 531 643 | 3/1993 |
| DE | 42 29 042 | 3/1993 |
| DE | 44 03 719 | 8/1995 |
| DE | 196 07 759 | 5/1997 |
| DE | 195 48 517 | 6/1997 |
| DE | 198 14 657 | 10/1999 |
| DE | 198 61 109 | 3/2000 |
| WO | WO 99/02882 | 1/1999 |

* cited by examiner

Primary Examiner—Bentsu Ro
(74) Attorney, Agent, or Firm—Crowell & Moring LLP

(57) ABSTRACT

The invention concerns a device and a method for monitoring an electromechanical brake-applying device designed for motor vehicle brakes. Said electromechanical brake-applying device comprises the following elements: a control member comprising an electric motor provided with electric supply; preferably a cylinder with accumulator including a spring which can be tensioned by the control member and serving to actuate a plunger to apply and release the vehicle brake. The monitoring device has a detecting unit for establishing an intensity and/or voltage curve of the current flowing in the electric supply whereof the output is connected to an evaluating unit for comparing the value of said intensity and/or voltage curve with previously stored threshold values and/or previously stored threshold value characteristic.

20 Claims, 4 Drawing Sheets

DEVICE AND METHOD FOR MONITORING A BRAKE-APPLYING ELECTROMECHANICAL DEVICE FOR VEHICLE BRAKES

BACKGROUND AND SUMMARY OF THE INVENTION

The invention relates to a device and a method for monitoring electromechanical brake application devices for vehicle brakes.

Spring-type accumulators are used mainly for operating parking brakes in the commercial vehicle field, in which the required manual force for operating a cable brake can no longer be applied by the driver. In the case of lighter vehicles, a parking brake effect is achieved mainly by a pure cable mechanism. The driver operates a lever at whose one end a Bowden cable is fastened which exercises a braking force upon normally two wheels of the vehicle.

Generally spring-loaded cylinders are designed such that a tensile or pressure effect occurs when the cylinder is ventilated. The operating force for the wheel brake is applied by a strong pressure spring which is supported on the housing of the cylinder and transmits the tensile force by way of a spring plate and a ball support to the piston rod. In its drive position, the cylinder is ventilated by way of a hand brake valve. For the braking, the pressure in the ventilated space is lowered by way of the hand brake valve. Corresponding to the lowering of the pressure, the pressure spring pulls the piston rod into the cylinder, whereby the wheel brake is operated. The spring chamber is ventilated by way of the expansion bellows.

Particularly in the case of rail vehicles, in addition to the pneumatic operation of the spring-loaded cylinder, the use of an electric-motor drive has also been discussed for tensioning the spring of the spring-loaded cylinder. A brake application device of this type is known, for example, from European Patent Document EP 0 129 969. This document shows a brake application device for rail vehicle brakes, in the case of which the drive shaft of an electric motor drives a threaded spindle of a threaded transmission. The rotatable threaded spindle is axially fixed and carries a recirculating ball nut which is disposed in a spring plate which continues into a push pull tube which is connected with a brake linkage for operating the brake shoes of a disk brake for rail vehicles. During the application of the brake, the push pull tube is pressed by an accumulator spring out of the housing to the outside. When the electric motor is acted upon by current, this electric motor tensions the accumulator spring by way of the threaded drive, which accumulator spring, during its contraction, withdraws the push pull tube into the housing and thus releases the brake.

The electric motor or rather the driven shaft of the electric motor is arranged essentially parallel to the threaded spindle of the threaded drive, a pinion being disposed on the output shaft of the electric motor, which pinion drives another pinion mounted on the threaded spindle.

A method of this type and a device of this type are known from German Patent Document DE 197 41 869 A1. This document illustrates a device for monitoring electromechanical brake application devices for vehicle brakes, in the case of which the brake application device, among other things, has a drive which comprises an electric motor with a current supply and a spring-type accumulator with a spring which can be tensioned by the drive for operating a tappet for the application and release of the vehicle brake. A diagnostic possibility is ensured by the electric operation of the electric motor.

The invention has the object of creating, by means of a simple device, a (particularly electronically operating) monitoring device as well as a monitoring method by which operating disturbances can be detected already in an early stage, so that a service or repair measure can be initiated before a detectable impairment of the operation of the brake application device or even a failure of the spring-type accumulator occurs. In particular, the monitoring device as well as the monitoring method should also be suitable for monitoring brake application devices with electromechanical spring-type accumulators.

The invention reaches this goal with respect to the device and with respect to the method according to the invention.

The monitoring device has a detection unit constructed as a sensor for detecting the current and/or voltage curve of the current supply, whose output is connected to an evaluating unit which is designed for comparing the detected current and/or voltage curve with previously stored desired values and/or previously stored desired value characteristics (and possibly emitting a fault signal on the basis of the comparison).

By means of the invention, the operating safety and reliability of the electromechanical spring-type accumulators can clearly be increased in comparison to spring-type accumulators—also with pneumatic release pistons—which do not have such monitoring devices—while the (additional) costs are low.

The invention is based on the recognition that the at least one drive (electric motor) used for releasing the electromechanical spring-type accumulator is also driven during the initial braking by the force of the spring—preferably by way of a spindle drive and a wrap-type and/or geared transmission. In this condition, the electric motor acts as a generator so that it generates current and so that a voltage is applied to it whose amounts depend essentially on the achieved rotational driving speed and possibly on the connected electric consuming devices. In the event of the faultless functioning of the spring-type accumulator, during an initial braking, a characteristic current or a characteristic voltage is therefore generated at the motor. These characteristic values (or even functions) may be filed in a memory and may be called up by the evaluating unit (which may, for example, be part—particularly software—of an EBS control unit).

Almost any disturbance in the operation of the electromechanical transmission system causes a changed rotational motor speed and thus affects the emitted generator voltage (or generator current). This starts in the case of trivial damage, such as broken or cold soldering joints, defective line cables or plug-type connections. In addition, also disturbances, such as sluggishness or even scuffing of the circulating ball spindle, of the transmission gear, of the spring-type accumulator piston, or a slipping or completely locking magnetic brake can be determined. If an operational disturbance occurs in the electric motor itself, such as a melted winding, a worn-out or broken brush, this also has a direct effect on the emitted current or the applied voltage. The breakage of a force-transmitting or torque-transmitting component can also be immediately detected. The evaluating unit is therefore preferably designed for comparing the detected curve of the current and/or voltage with previously stored desired values and/or with a previously stored desired-value characteristic during a generator operation of the electric motor.

With respect to the method, the invention achieves its object in that, by means of the detecting device, the curve of the current and voltage in the current supply is monitored at least in the generator operation and/or in the motor operation of the electric motor and is compared by means of the evaluating unit with previously stored desired values or with a previously stored desired-value characteristic, in which case, when deviations occur from the previously stored desired values or the previously stored desired-value characteristic, a fault signal is generated.

In addition to the monitoring of the voltage or current at the electric motor, it is expedient to place additional sensors for supplementary purposes in the system. Preferably by means of distance sensors (for example, inductively) on the threaded spindle, the precise position of the spring-type accumulator and thus the amount of the braking force is determined. For the purpose of the monitoring, the spindle position is also determined during the drive. By means of a pure voltage or current monitoring, it is, for example, not possible to detect a very slow closing of the brake during the drive because in principle no current is generated by the electric motor, as expected also during a correct operation. In addition, this sensor is used for promoting and supplementing the monitoring of the voltage or current.

With its aid, it is even possible to use the spring-loaded brake as an emergency brake or service brake. As a result of the fact that the force at the brake is determined by the spindle position, the distance sensor is simultaneously used as a braking force sensor. Thus, a brake signal given by the driver corresponding to the braking desire can be converted to a defined braking force at the wheel.

Instead of a distance sensor, the use of a different type of displacement transducer is also possible; for example, a rotation transducer at the spindle nut or at the roller bearing or an angle sensor. As a result, by means of a corresponding conversion, a conclusion can be drawn with respect to the travel path of the spindle and thus with respect to the braking force.

According to another variant of the invention, the application device of the disk brake comprises a holding device which has a mechanically and/or electromagnetically releasable brake which generates the force for holding the spring (particularly mechanically). For example, a disk-type spring pressure brake, which is known per se, can be used for this purpose. In contrast to the prior art of the above-mentioned type, the force for holding the spring-type accumulator is applied mechanically. This results in the advantage of a minimal current consumption while the durability is prolonged.

Additional advantageous further developments of the invention are contained in the remaining subclaims.

In the following, the invention will be described in detail by means of embodiments with reference to the drawing.

DETAILED DESCRIPTION OF THE DRAWINGS

Figure 1:
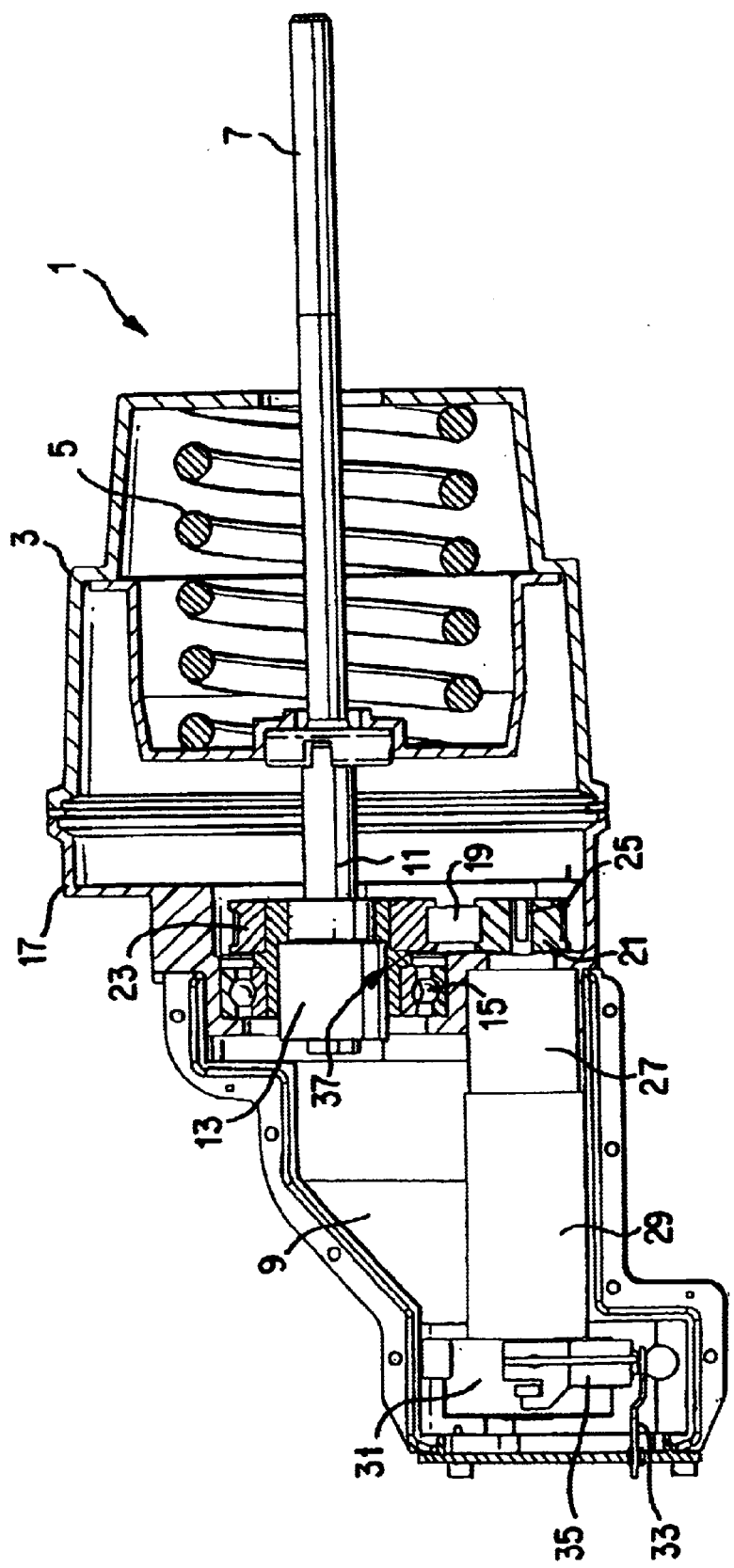
FIG. 1 is a schematic, partially sectional representation of a spring-type accumulator whose function can be monitored by means of the invention.

FIG. 1 illustrates a spring-type accumulator with a first housing section 3 accommodating a spring 5 which exercises a force by way of a plunger 7 upon a brake system (not shown here) in order to brake a vehicle.

An electro-mechanical triggering unit 9 is arranged on the spring-type accumulator 1. For exercising force upon the spring-type accumulator 1, a linear drive is used which is implemented by means of a ball screw (roller screw drives, among others, are also conceivable). For this purpose, the axially displaceable ball screw spindle 11 transmits the force upon the plunger 7 which results in the tensioning of the spring 5. A spindle nut 13, which is fixed by way of a bearing 15 in a second housing section 17, is disposed on the ball screw spindle 11. A special advantage of the drive by means of a ball screw (or a planetary screw, etc.) is the favorable overall efficiency which can be achieved by means of the latter in comparison to hydraulic or pneumatic solutions.

The driving of the spindle nut 13 takes place by way of a synchronous belt (drive) 19 (chain drives, spur gears and similar drives are also conceivable). The wheel 23, which is disposed on the spindle nut 13, is driven by the pinion 21 by way of the synchronous belt 19. The pinion 21, in turn, is fastened on the output shaft 25 of a planetary gear 27 (spur gears, cycloid gears and similar gears are also conceivable). The gear 27 is also fixed in the housing 17. The drive of the entire system is implemented by way of an electric motor 29.

In order to be able to hold the brake in the driving position without keeping the motor 29 energized, a mechanically and electro-magnetically releasable brake 31 is mounted on the shaft of the motor 29. In the non-energized condition, the motor is held in its position by means of a spring mechanism, which constitutes a fixing for the entire unit. When the magnetic brake 31 is provided with a flow or when the mechanical release device 35 is actuated by means of the cable control 33, the motor shaft can rotate freely in both directions and the brake can be released or engaged.

The entire mechanism is adjusted such that, for relaxing the spring-type accumulator 1, the spring force of the spring 5 will be sufficient; that is, no assistance by the electric motor 29 is required. The motor 29 is necessary only for tensioning the spring 5. The system is therefore not self-locking.

The spring 5 will supply its force to the overall system until it is either held again by the effect of the magnetic brake 31 or is in an equilibrium with the spring force of the brake (full braking/parking position). However, in this case, the masses of the motor 29 and of the transmissions connected on the output side (the entirety of the interacting transmissions has the reference number 37) are accelerated to their maximal rotational speed. This kinetic energy is converted to additional potential (deformation) energy at the brake; that is, the brake continues to be applied. As soon as this kinetic energy has been completely converted, the magnetic brake 31 will operate and stop the entire arrangement. This results in a type of "dynamic retensioning effect". This effect can be intensified when the electric motor 29 starts to run again at the reversal point of the starting damped harmonic vibration, that is, before the start of the operation of the magnetic brake 31, and further increases the braking force. This mechanism permits a smaller dimensioning of the spring 5 than would be required for the holding function alone. This is another significant advantage with respect to a further reduction of the required space, of the weight and of the costs.

As a result of the magnetic brake 31, the device can be held in any position. This has the effect that the application device acts not only as a parking brake but, by means of a simple control, can also act as an actuating device for the service brake or emergency brake because the braking force can be applied at an arbitrary amount up to the maximal spring force.

A characteristic of the electromechanical spring-loaded cylinder of FIG. 1 consists of the fact that, when the parking brake is engaged, that is, when the spring 5 is relaxed, a generator effect is created at the electric motor 29 because the spring 5 drives the motor 29 by way of the worm drive 11, the wrap transmission 19 and the planetary gear 27, so that this motor 29 generates current. The invention utilizes this fact for implementing a monitoring device and a monitoring process.

Figure 2:
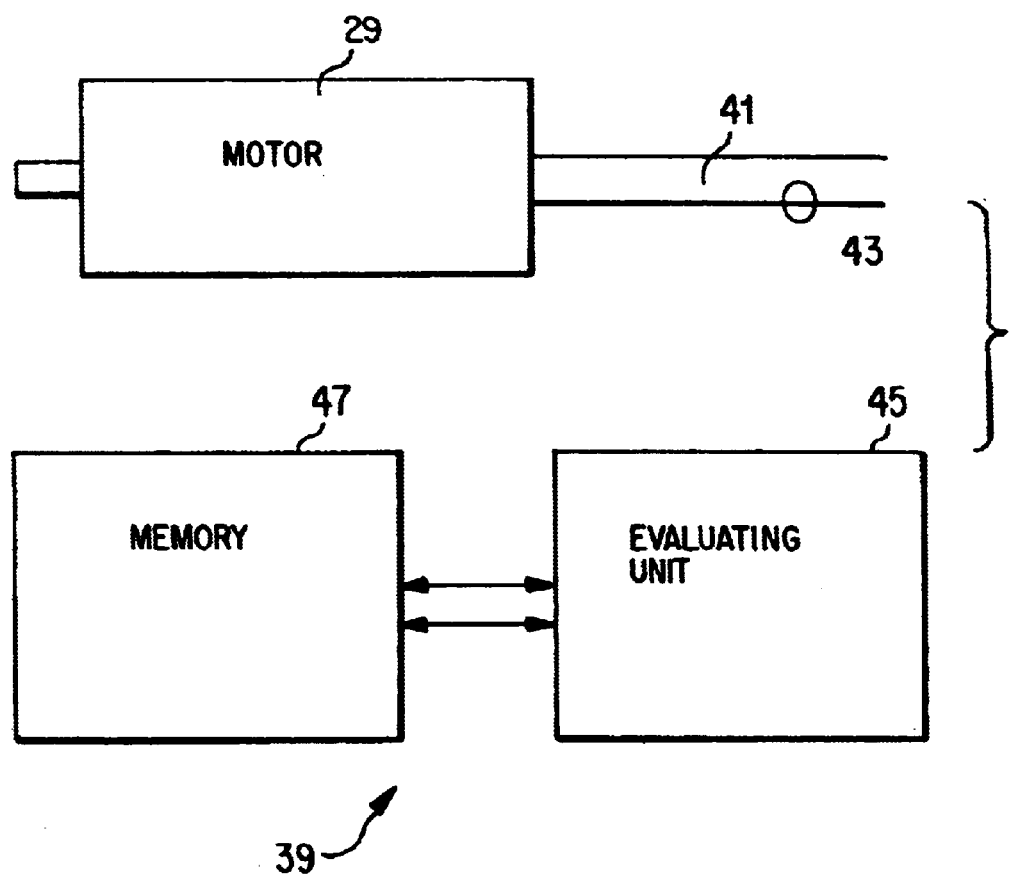
FIG. 2 is a block diagram of components of the monitoring device according to the invention.

According to FIG. 2, the monitoring device 39 has a sensor 43 which is only schematically indicated in FIG. 2 and by means of which the voltage and/or current curve can be sensed in the feed line(s) 41 to the electric motor 29. The output of the sensor 43 is connected to an evaluating unit 45' which is designed for comparing the current and/or voltage curve determined by means of the sensor 43 with previously stored desired values (memory 47) and/or a previously stored desired-value characteristic. Corresponding integrated circuits, which are commercially available, are suitable for such operations.

Figure 3:
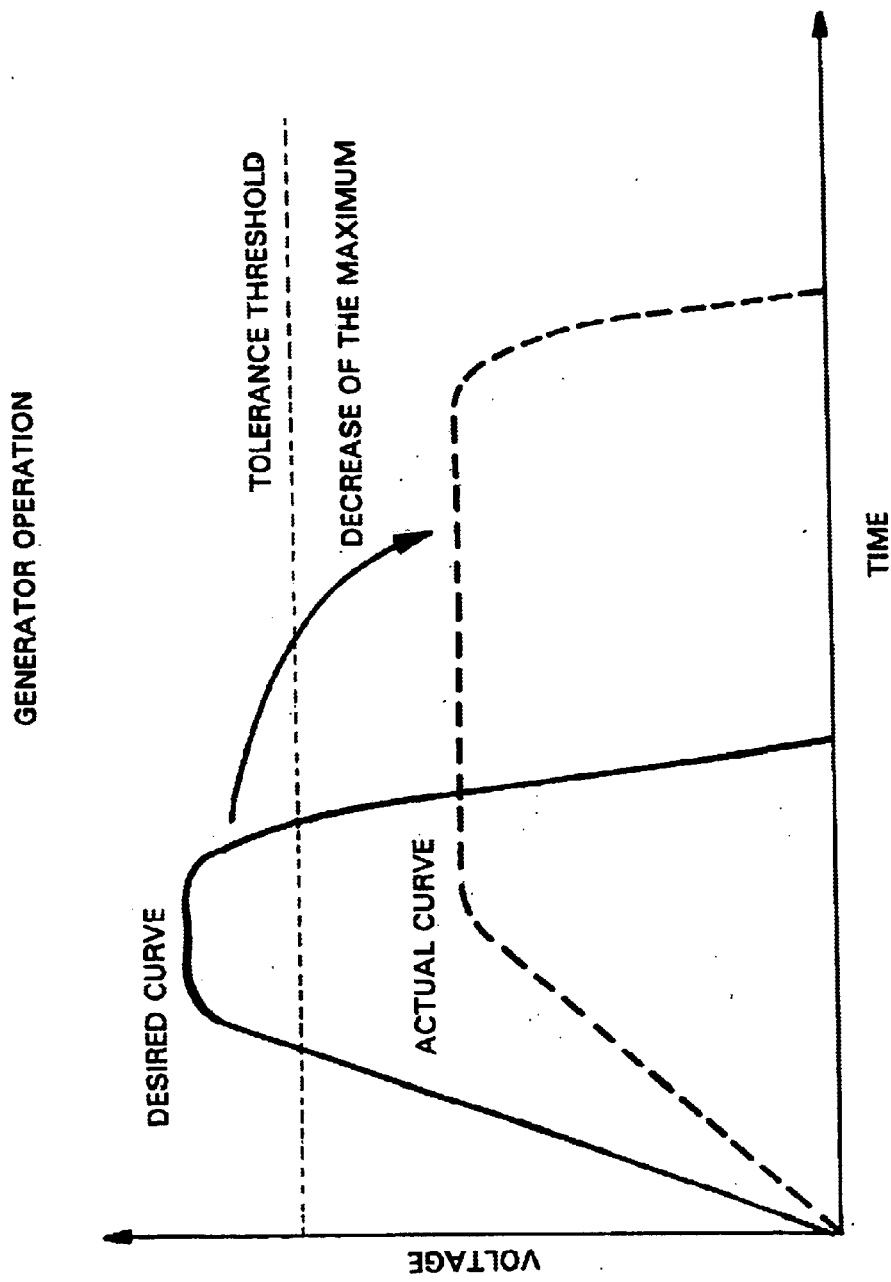
FIG. 3 is a diagram which compares a desired characteristic of the voltage curve in the generator operation of the motor with an actual characteristic in the event of a defect.

FIG. 3 shows a comparison of the desired curve of the generator voltage, when the parking brake is engaged, with a curve, as it may occur, for example, when the threaded spindle is sluggish. In this case, the maximum of the voltage will be lower because the rotational motor speed is lower. For the purpose of a monitoring, a tolerance threshold for the permissible minimal voltage or current is defined in the generator operation of the spring-type accumulator and, when there is a falling below this threshold during the generating of the current, a warning signal is emitted. The warning signal may consist of the switching-on of a brake control light and/or, in the case of vehicles having a driver information or service information system, the warning signal may be a corresponding warning message while utilizing these systems, in this case, a defect indication already being possible. Also before the installation of the system into the vehicle, by means of a simple electronic system, the operability of the electromechanical spring-type accumulator can be checked. In the case of a perfect functioning of the spring-type accumulator 1 and of the release mechanism, this generator voltage or current will exceed the defined minimum value. If this minimum value is not reached, this is an indication of a beginning disturbance.

There are essentially two indicating conditions: The magnetic brake is energized or is not energized. When the magnetic brake is energized, it will open and release the release mechanism. By means of the force of the spring 5, the electric motor 29 will be driven by way of the release mechanism, so that it supplies a current and so that a voltage is applied. When this voltage (or the pertaining current) exceeds a defined desired value (tolerance threshold), the message "system in order" will be emitted. When the desired voltage (current) is not reached, the emission will be "system is out of order".

When, in contrast, the magnetic brake 31 is not energized, it brake is closed by spring pressure in this condition and therefore blocks the release mechanism. In this condition, the motor supplies no voltage. A defect is not present. However, if, while the magnetic brake 31 is not energized, voltage is determined at the motor 29, the electronic system will emit the message "system out of order". This will occur when the spring-loaded brake cannot hold the release mechanism still against the force of the driving spring 5 and slips. The spring-type accumulator 1 will start braking.

Likewise, the consequences of an occurring disturbance can be avoided by the corresponding controlling of the electric drive. This will be discussed in detail by means of the defect of the slipping magnetic brake 31.

In this situation, the spring-type accumulator 1 moves in against the slipping 31 blocking brake. The lack of a control measure would result in a braking of the concerned vehicle brake with the connected sudden brake pull of the vehicle, for example, at full speed. In this case, a generator voltage is applied to the motor 29 although, when the brake is released, the voltage should be zero. As soon as this defect is detected, the motor 29 is immediately, even before the braking becomes effective, acted upon by a voltage and the brake is held in the driving position. Simultaneously, the warning message and/or the driver/service information system is switched to the defect message.

Figure 4:
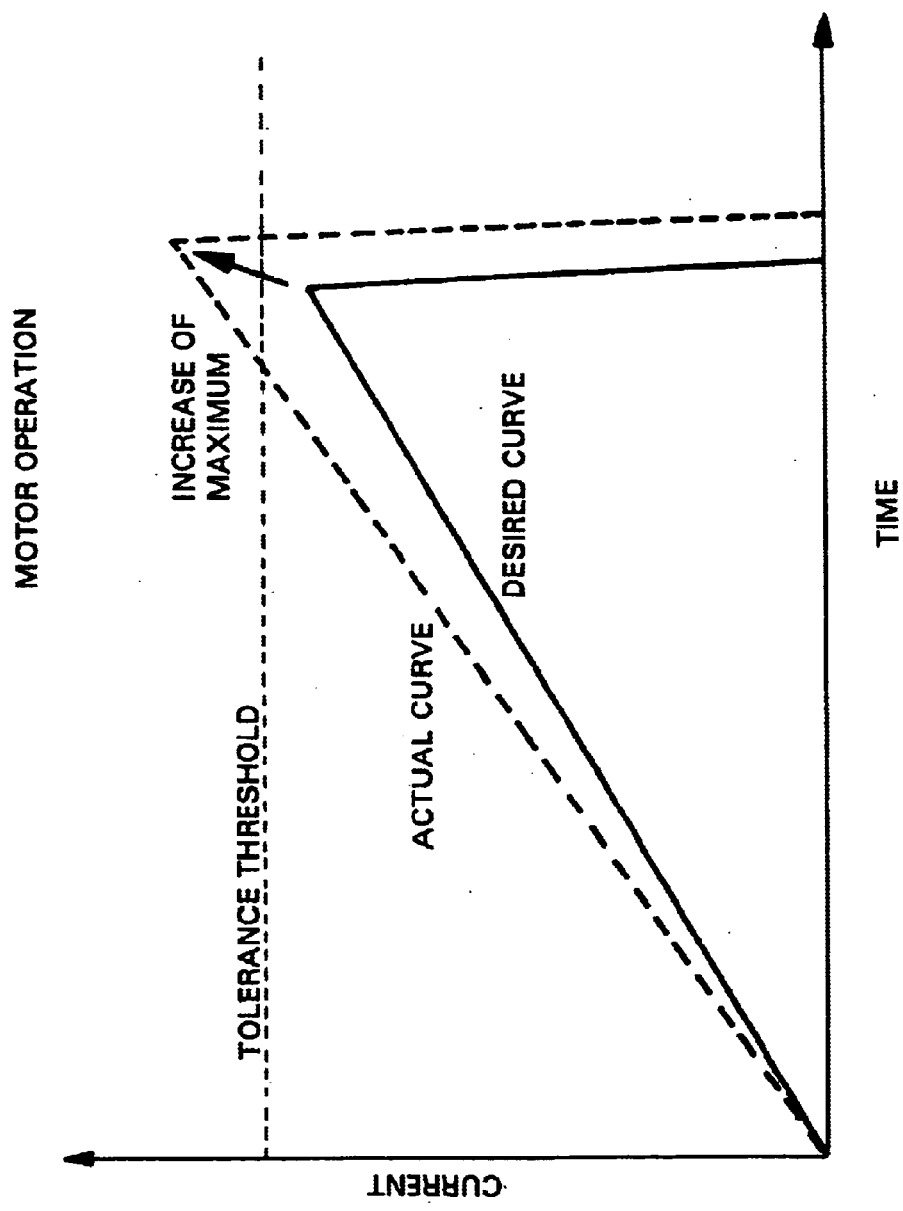
FIG. 4 is a diagram which compares a desired characteristic of the voltage curve in the generator operation of the motor with an actual characteristic in the event of a defect.

Analogously, it is possible to detect the current and compare it with a desired value. When the spring-type accumulator 1 is tensioned in the event of a defect (such as sluggishness), a current curve will occur as illustrated in FIG. 4. As a result of the sluggishness, the power consumption of the motor 29 will increase in order to be able to tension the spring 5. This is demonstrated by the increased current consumption. When the maximum of the current exceeds the tolerance threshold, a defect message is emitted.

Table of Reference Numbers

Spring-type accumulator 1
housing section 3
spring 5
plunger 7
triggering unit 9
ball screw spindle 11
spindle nut 13
bearing 15
housing section 17
synchronous belt 19
pinion 21
wheel 23
output shaft 25
planetary gear 27
electric motor 29
magnetic brake 31
cable control 33
releasing device 35
transmission 37
monitoring device 39
feed line 41
sensor 43
evaluating unit 45
memory 47

What is claimed is:

1. Device for monitoring an electro-mechanical brake application device for a vehicle brake, the electro-mechanical brake application device having a drive which comprises an electric motor with a current supply, and a spring-loaded cylinder having a spring, which is tensionable by the drive, for actuating a plunger for the application and release of the vehicle brake, the device comprising:

a detecting device for detecting the current and/or voltage curve in the current supply;

an evaluating unit connected to an output of the detecting device, the evaluating unit comparing the detected current and/or voltage curve with previously stored desired values and/or a previously stored desired-value characteristic; and wherein the detecting device has a sensor, which is assigned to the current supply, for sensing the current or voltage curve applied in a feed line to the electric motor.

2. Monitoring device according to claim 1, wherein the evaluating unit is designed for comparing the detected current and/or voltage curve with the previously stored desired-value characteristic in a generator operation of the electric motor.

3. Monitoring device according to claim 2, wherein the evaluating unit is designed for comparing the detected current and/or voltage curve with the previously stored desired-value characteristic in a motor operation of the electric motor.

4. Monitoring device according to claim 2, wherein the evaluating unit is designed for emitting a defect message in an event of a limit-value-exceeding deviation from the desired-value characteristic.

5. Monitoring device according to claim 2, wherein the evaluating unit is designed for initiating a defect correction in the event of a limit-value-exceeding deviation from the desired-value characteristic.

6. Monitoring device according to claim 2, wherein the brake application device has a transmission which is assigned to the electric motor and has a spindle device for tensioning the spring.

7. Monitoring device according to claim 1, wherein the evaluating unit is designed for comparing the detected current and/or voltage curve with the previously stored desired-value characteristic in a motor operation of the electric motor.

8. Monitoring device according to claim 7, wherein the evaluating unit is designed for emitting a defect message in an event of a limit-value-exceeding deviation from the desired-value characteristic.

9. Monitoring device according to claim 7, wherein the evaluating unit is designed for initiating a defect correction in the event of a limit-value-exceeding deviation from the desired-value characteristic.

10. Monitoring device according to clam 7, wherein the brake application device has a transmission which is assigned to the electric motor and has a spindle device for tensioning the spring.

11. Monitoring device according to claim 1, wherein the evaluating unit is designed for emitting a detect message in an event of a limit-value-exceeding deviation from the desired-value characteristic.

12. Monitoring device according to claim 11, wherein the evaluating unit is designed for initiating a defect correction in the event of a limit-value-exceeding deviation from the desired-value characteristic.

13. Monitoring device according to claim 11, wherein the brake application device has a transmission which is assigned to the electric motor and has a spindle device for tensioning the spring.

14. Monitoring device according to claim 1, wherein the evaluating unit is designed for initiating a defect correction in the event of a limit-value-exceeding deviation from the desired-value characteristic.

15. Monitoring device according to claim 1, wherein the brake application device has a transmission which is assigned to the electric motor and has a spindle device for tensioning the spring.

16. Monitoring device according to claim 15, further comprising a displacement transducer arranged on the spindle device.

17. Monitoring device according to claim 16, wherein the displacement transducer is constructed as a distance sensor.

18. Monitoring device according to claim 16, wherein the displacement transducer is constructed as a rotation transducer.

19. Monitoring device according to claim 1, wherein the application device has a holding device which comprises a mechanically and/or electro-magnetically releasable brake.

20. Method of monitoring an electro-mechanical brake application device for a vehicle brake having a monitoring device comprising a detecting device for detecting the current and/or voltage curve in a current supply, an evaluating unit connected to an output of the detecting device, said evaluating unit comparing the detected current and/or voltage curve with previously stored desired values and/or a previously stored desired-value characteristic, and wherein the detecting device has a sensor, which is assigned to the current supply, for sensing the current or voltage curve applied in a feed line to an electric motor of the electro-mechanical brake application device, the method comprising the acts of:

monitoring, via the detection device, a current and voltage curve in a current supply in a generator operation and/or in a motor operation of the electric motor;

comparing, via the evaluating unit, the monitored current and voltage curve with previously stored desired values or with a previously stored desired value characteristic; and in an event of an occurrence of deviations from the previously stored desired value or the previously stored desired-value characteristic, generating a defect signal.

* * * * *